United States Patent Office 3,705,246
Patented Dec. 5, 1972

3,705,246
ANTI-DERMATOPHYTOSIC COMPOSITION AND METHOD OF USE
Togo Yamano, Yamatotakada, Teruji Henmi, Amagasaki, Yoshiro Usui, Ibaraki, Etsunosuke Noda, Yao, and Masayuki Yamada, Kawanishi, Japan, assignors to Takeda Chemical Industries, Ltd., Higashi-ku, Osaka, Japan
No Drawing. Filed Mar. 26, 1969, Ser. No. 810,801
Claims priority, application Japan, Mar. 26, 1968, 43/19,590
Int. Cl. A61k 27/00
U.S. Cl. 424—270
9 Claims

ABSTRACT OF THE DISCLOSURE

The present invention relates to a method for treating dermatophytosis by applying to the region of dermatophytosis the compound 3-(p-methylbenzylideneamino)-4-phenylthiazoline-2-thione as the active ingredient. The present invention also provides for compositions prepared from the aforementioned active ingredient.

---

The present invention relates to a composition for the therapy of dermatophytoses as well as a method for treating dermatophytoses therapy.

Dermatophytosis is a class of diseases caused by dermatophytes as they invade the keratinous structures of the human body, that is to say, the horny layer of the skin as well as such skin appendages as the hairs, nails and the like, in particular.

Dermatophytes may find their way deep into the outer layer of the epidermis and into the hair follicules.

Symptoms of such fungal skin infections are vesiculation, scaling, maceration, fissuring and erosion of the skin, as well as an itching sensation around the involved areas and, sometimes, some allergic regions.

Some representative cases of dermatophytosis include *Tinea capitis* (ringworm of the scalp), *Tinea unguium*, *Tinea corporis*, *Tinea cruris*, *Tinea pedis*, *Kerion celsi*, *Tinea barbae*, *Tinea favosa*, *Tinea versicolor*, erythrasma and the like.

Heretofore various therapies include oral medication, beam-therapy and local treatment have been proposed for the treatment of dermatophytosis, but none of them has as yet proved a complete and pertinent remedy. As a typical oral medication, for instance, a large dosage and prolonged administration of Griseofulvin (an antibiotic) has been counted but its therapeutic effect is not always as pinpointed as might be desired and, in addition, the antibiotic is liable to induce gastrointestinal distress. A typical beam therapy would involve the use of ultraviolet light, but it fails to offer a positive remedy because it not only requires prolonged irradiation but also tends to cause skin troubles. Local remedies which are currently most prevalent consist in the direct application of some antimicrobial agent or other to the lesions, but many of the hitherto-known antimicrobial agents are compounds which are toxic to humans and do not offer a fully satisfactory remedy. In any of those therapies, a naked-eye or subjective recovery does not necessarily keep pace with a mycological healing, and any radical treatment of the disease with a complete eradiction of the fungal elements from the lesions cannot be attained.

Therefore, it is the principal object of this invention to provide a novel method for effectively treating dermatophytoses without substantial harm to the patients.

It is another object of this invention to provide an anti-dermatophytosic composition which exhibits therapeutic effects against the infection of various dermatophytes, and which is conveniently and effectively used for the therapy of dermatophytoses.

It is a further object of this invention to provide particularly preferable preparations for the same purpose which are stable and convenient in storage and transportation.

Further objects will be apparent from the description detailed hereinafter in this specification.

The first two objects are realized by applying to the region of dermatophytosis an effective amount of 3-(p-methylbenzylideneamino) - 4 - phenylthiazoline-2-thione (the compound may briefly be referred to as "MPT" hereinafter), the compound being represented by the formula:

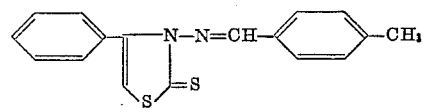

MPT is easily produced, for example, by reacting 3-amino-4-phenylthiazoline-2-thione and p-tolualdehyde under acidic conditions, and it forms pale yellow needles upon recrystallization from ethanol.

MPT has interesting therapeutic and pharmaceutical properties. In this specification, the following abbreviations are adopted.

| | |
|---|---|
| μg. | Microgram. |
| ml. | Milliliter. |
| mg. | Milligram. |
| kg. | Kilogram. |
| mm. | Millimeter. |
| g. | Gram. |
| $LD_{50}$ | a dose which is lethal to 50% of the animal tested. |

(1) One of the characteristic properties of MPT is a strong antimicrobial potency which is specific to dermatophytes notwithstanding less potency against bacteria. The fact is shown, for example, in the following Test 1.

TEST 1.—ANTIMICROBIAL SPECTRUM OF MPT

Method: agar dilution method

Culture medium: glucose-bouillon (1% glucose, 1% meat extract, 1% polypeptone, 0.25% sodium chloride: pH 6.0).

| Test organism | | Minimum inhibitory concentration μG./ml. |
|---|---|---|
| Fungal species: | | |
| *Trichophyton mentagrophytes* | IFO 5809 | 0.78–1.56 |
| *Epidermophyton floccosum* | IFO 9045 | 0.39–0.78 |
| *Trichophyton rubrum* | IFO 5467 | 0.78–1.56 |
| *Trichophyton asteroides* | IFO 7522 | 0.78–1.56 |
| *Microsporum gypseum* | IFO 6078 | 0.78–1.56 |
| General bacteria: | | |
| *Bacillus subtilis* | PCI 219 | 100 |
| *Bacillus cereus* | IFO 3466 | 100 |
| *Staphylococcus aureus* | FDA 209P | 100 |
| *Serratia phymuthicum* | IFO 3055 | 100 |
| *Corynebacterium equi* | IFO 3730 | 100 |
| *Pseudomonas auruginosa* | IFO 3080 | 50 |
| *Escherichia coli* | IFO 3044 | 100 |

(2) MPT sustains its activity substantially unabated even in the presence of serum as is shown, for example, in Test 2 below. This is the property unshared by any chemotherapeutic agent that has heretofore been employed in the treatment of dermatophytosis.

TEST 2.—ANTIMICROBIAL POTENCIES IN THE PRESENCE OF SERUM

Assay organism: *Trichophyton mentagrophytes*
Culture medium: Sabouraud's medium (4% glucose, 1% peptone, 1.5% agar; pH 5.6)
Amount of serum added: 10% of horse serum

| Assay method | Minimum inhibitory concentration (μg./ml.) | |
|---|---|---|
| | Agar dilution | Broth dilution |
| Specimen: | | |
| MPT: | | |
| Without serum | 1.56 | 1.56 |
| With serum | 1.56–3.12 | ≦3.12 |
| Thimerosal: | | |
| Without serum | 0.1 | 0.2 |
| With serum | 0.78 | 1.56 |

(3) MPT is quite low in toxicity against mammals as shown in Test 3 and furthermore gives no irritation to skin as noted, for example, by Test 4. MPT can therefore be applied to humans safely.

TEST 3.—LD₅₀ OF MPT
[mg./kg.]

Test procedure: The median lethal doses (calculated by Litchfield-Wilcoxon method (The Journal of Pharmacology and Experimental Therapeutics, volume 96, page 99 (1949)) of MPT were measured using 4-week old ICR-JCL/T male mice and 5-week old SD-JCL/T male rats

| Route of administration | Animals | |
|---|---|---|
| | Mice | Rats |
| Intraperitoneal | 10,500 (9,210–11,970) | >10,000 |
| Subcutaneous | >10,000 | >10,000 |
| Oral | >10,000 | >10,000 |

NOTE.—Figures in parentheses represent 95% confidence limits.

TEST 4.—SKIN TEST RESULTS WITH MPT

Test method: Test rabbits and guinea pigs were unhaired on the back, and the test solution was applied to one half of the denuded area (0.5 ml. one daily for two rabbits and 3 ml. once daily for two guinea pigs, for consecutive thirty days), with the other half being left untreated as control. The halves are visually examined
Test solutions (1) 2% solution of MPT in the control solvent (ethanol:diethyl sebacate=1:1 by volume); (2) Control solvent

| Test specimen | Animals | | | |
|---|---|---|---|---|
| | Rabbits | | Guinea pigs | |
| | 1 | 2 | 1 | 2 |
| 1. 2% solution of MPT | + | − | + | + |
| 2. Control solvent | − | + | + | + |

NOTE.—Evaluating standards: − no erythema; + faint erythema.

(4) MPT is effective at various growth stages of dermatophytes. This is a quite unique property of MPT and is demonstrated, for example, by the following test.

TEST 5

Antimicrobial potencies as measured by paper disc method at timed intervals

Assay organism: *Trichophyton mentagrophytes*
Paper disc: Manufactured by Toyo Roshi, 8 mm. in diameter.
Specimens: 50 μg./ml. of MPT and 25 μg./ml. of thimerosal, in ethanol.
Amount of serum added: 10% relative to medium.

Assay: A suspension of the spores of *Trichophyton mentagrophytes* was added to Sabouraud's agar medium (2% agar), and after thorough blending, the mixture was dispensed into cans.

The resulting plates were incubated in a thermostatic incubator at 28° C. In the meantime, paper discs which had been pretreated by dipping them in a 50 μg./ml. MPT solution or a 25 μg./ml. thimerosal solution (in ethanol), respectively, and allowing them to dry in the air, were applied to the surfaces of the plates at the intervals of 0, 15, 24 and 40 hours, respectively, after the commencement of cultivation. The incubation was further continued, and the diameter of the zone of inhibition was measured at the 30th hour after the application of each paper disc.
Result:

| Incubation time (hours) before application of paper disc | Diameter of the zone of inhibition (mm.) | | | |
|---|---|---|---|---|
| | 0 | 15 | 24 | 40 |
| Reagent: | | | | |
| MPT: | | | | |
| Without serum | 38.0 | 33.0 | 29.4 | 25.6 |
| With serum | 16.5 | 14.6 | 14.4 | 11.0 |
| Thimerosal: | | | | |
| Without serum | 30.9 | 24.9 | 19.4 | 11.5 |
| With serum | 16.2 | 12.9 | 11.5 | <9.0 |

The results show that whereas thimerosal suffers a substantial drop in antimicrobial activity when administered after the hyphae have grown to a substantial extent, MPT show no significant reduction in activity but remains substantially effective even when administered at the hyphal growth stage equivalent to a 40-hour culture. Thus, in terms of activity at various growth stages of the microorganism, whether or not in the presence of serum, MPT is superior to thimerosal.

When MPT is administered to man, both the itching sensation and inflammation in the involved area disappear or are alleviated until a complete healing ultimately results.

The composition of this invention may be applied in any suitable manner. For example, as a dermatophytosis remedy, MPT in a state of fine powders conditions may be applied to the lesions.

In practice, and for high effectiveness, the antidermatophytosic composition of the present invention comprises essentially MPT and a suitable adjuvant (such as solvent, solid carrier or surface active agent) of the type commonly referred to, in connection with the application of an topicum.

The composition may be ready-prepared as initio or may be in a form of concentrate comprising MPT as the active ingredient with an adjuvant. Such a concentrate is economical as regards transportation storage and the like, and may easily be admixed-prior to use-with additional adjuvants to give the desired concentration of the active ingredient.

The solvent may be volatile or non-volatile, which is exemplified by methyl alcohol, ethyl alcohol, acetone, methyl ethyl ketone, methyl isobutyl ketone, dimethylformamide, glycerine, etc.

For example, the solid carrier may be talc, kaoline, calcium sulfate, starch, magnesium carbonate zinc oxide, titanium dioxide and the like.

Examples of the surface active ingredient are polyoxyethylene alkylarylethers, alkyl phenol polyglycol ethers, alkali metal salts of the alkyl and alkyl aryl sulfonates, the fatty acid esters of polyhydric alcohols, sorbitan fatty acid ester, etc.

Of course, the composition may contain other antidermatophytosic ingredients, fungicides, sterilizers. They may also contain coloring, perfume and the like, all these additions being considered "adjuvants."

The resulting preparation may be a powder, a liquid (such as tincture, solution, suspension, or emulsion), an ointment (such as paste, cream) or a spray (such as aerosol, etc.).

Of course, other preparations (such as pellets or cataplasm) can be used as desired according to particular application.

Generally speaking, a suitable concentration of the active ingredient is from about 0.1 to about 50% on a weight basis relative to the whole composition.

When a powdery form is employed, the concentration of the active ingredient is advantageously from about 1 to about 50% on a weight basis, most advantageously from about 10 to about 30% on a weight basis relative to the whole composition.

When a liquid form or an ointment form is employed, the concentration is advantageously from 0.1 to about 10% on a weight basis, most advantageously from about 1 to about 2% on a weight basis relative to the whole composition.

When the preparation is of a spray-type, the concentration is advantageously from about 0.01 to about 20% on weight basis, most advantageously from about 0.5 to about 5% on a weight basis relative to the whole composition.

However, the said ranges can be modified as desired depending on any particular form of application.

While the foregoing remedial composition for dermatophytosis are fully adequate for the treatment of the disease, a few additional pharmaceutical questions are desirably answered before the remedy is made commercially available.

Since MPT to be employed according to this invention is a comparatively unstable compound which tends to degrade under the influences of heat, oxygen, light and moisture, it is desirable that the compound be used in such formulations as will resist such degradation. It is also desired that the resulting formulations be immune to a reduction in concentration of the active ingredient, crystallization thereof, discoloring and other effects of aging.

For this purpose, when the formulation is a moist preparation such as a liquid preparation, an ointment or a spray it is recommended to employ one or more of carboxylic esters and higher fatty acids as a carrier (carrier ingredient A), which is effective for solubilizing the active ingredient as well as for stabilizing the whole formulations.

Furthermore, as a stabilizing agent for the active ingredient, solely or, preferably in combination with carrier ingredient A, use may be made of one or more of phenol type antioxidants, aliphatic amines and carboxylic acids having at most 10 carbon atoms (carrier ingredient B). The most advantageous results are observed when a mixture of a phenol type antioxidant, an aliphatic amine and a carboxylic acid is used as the carrier ingredient B.

Generally speaking, the concentration of the carrier ingredient A is from about 5 to about 60% on a weight basis and that of the carrier ingredient B is from about 0.01 to about 10% on weight basis, respectively.

However, the said ranges can be modified as desired according to particular applications.

The carboxylic esters are employed in the present invention as above. Among them, more desirable carboxylic esters are those having a carboxylic residue of a carbon atom number within the range of from 1 to 25. Accordingly, for example, salicylic acid esters such as monoglycol salicylate, propyl salicylate, sebacic acid esters such as diethyl sebacate, dimethyl sebacate, di-2-ethylhexyl sebacate, myristic acid esters such as isopropyl myristate, methyl myristate, ethyl myristate, propyl myristate, butyl myristate, heptyl myristate, palmitic acid esters such as isopropyl palmitate, methyl palmitate, ethyl palmitate, propyl palmitate, butyl palmitate, hetpyl palmitate are employed preferably.

Generally speaking, the higher fatty acids to be employed in this invention are those having a carbon atom number within the range of from 10 to 30, particularly from 12 to 18, which are exemplified by lauric acid, myristic acid, palmitic acid, margaric acid stearic acid.

The phenol type antioxidant to be used as the carrier ingredient B includes, among others, butylhydroxy toluene, butyl hydroxyanisol, pyrocatechol, pyrogallol, and the like, of which butylhydroxy toluene is the most advantageous.

The aliphatic amines to be employed in this invention can be classified into primary aliphatic amines, secondary aliphatic amines and tertiary aliphatic amines.

In general, the primary aliphatic amines are those having a carbon atom number within the range from 1 to 15, particularly from 1 to 12, which are exemplified by monoethanolamine, aminomethylpropanediol.

The secondary aliphatic amines are those having a total carbon atom number within the range from 2 to 20, particularly from 2 to 12, which are exemplified by diethanolamine.

The tertiary aliphatic amines are those having a total carbon atom number within the range from 3 to 9 which are exemplified by trimethylamine, triethylamine, tripropylamine or triethanolamine.

The carboxylic acid containing up to 10 carbon atoms includes, for example, such aromatic carboxylic acids as benzoic acid, salicylic acid, etc. and lower aliphatic carboxylic acids such as citric acid, succinic acid, malonic acid, tartaric acid, fumaric acid, maleic acid, etc. Those carboxylic acids may be used in the form of metal salts, e.g. the salts of sodium, potassium and the like.

The MPT-containing drug according to this invention can be obtained by compounding MPT with the above-mentioned ingredients and, if desired, further with a solvent and other additives.

As a specific example of the method for the production of a liquid preparation, the following procedure may be mentioned in which MPT is dissolved in e.g., glycol salicylate and the resulting solution is further mixed with e.g. butylhydroxytoluene or triethanolamine, followed by the addition of e.g. ethanol or acetone to make the required total volume.

The resulting local dermatophytosis remedy is so stable that on storage at 40° C. for a few months, it does not undergo any appreciable degradation of MPT nor does it suffer a crystallization of MPT or deposition of other solid substances.

COMPOSITION 1

| | (1–1) | (1–2) |
|---|---|---|
| MPT, g | 2 | 2 |
| Monoglycol salicylate, g | 20 | 20 |
| Butylhydroxytoluene, g | 0.2 | |
| Triethanolamine, g | 0.2 | |
| Methyl ethyl ketone, ml | 40 | 40 |
| Ethanol | (1) | (1) |

[1] To 100 ml.

The drug of the above (1–1) formula, after 3 month's standing at 40° C. gives a remedium cardinale retention rate of 98% and shows no signs of depositing solid substances. In contrast, the drug of the (1–2) formula free of the phenol type antioxidant and aliphatic amine is unsatisfactory because it gives a remedium cardinale retention rate of as low as 23% and shows a deposition of solid substances under the same conditions as above.

COMPOSITION 2

| | (3–1) | (3–2) |
|---|---|---|
| MPT, g | 1 | 1 |
| Diethyl sebacate, g | 30 | 30 |
| Methyl salicylate, g | 20 | 20 |
| Pyrogallol, g | 0.3 | |
| Triethanolamine, g | 0.8 | |
| Tartaric acid, g | 0.1 | |
| Ethanol | (1) | (1) |

[1] To 100 ml.

The drug of the above (3–1) formula, after 3 month's standing at 40° C., gives a remedium cardinale retention rate of 98% and shows no deposition of solid substances. In contrast, the drug of the (3–2) formula free of the aliphatic amine, carboxylic acid and antioxidant is unsatisfactory, for it gives a remedium cardinale retention rate of 22% and shows a deposition of solid substances under the same conditions as above.

COMPOSITION 3

| | (4–1) | (4–2) |
|---|---|---|
| MPT, g | 1 | 1 |
| Diethyl sebacate, g | 20 | |
| Butylhydroxyanisol, g | 0.2 | |
| Sodium benzoate, g | 0.3 | |
| Water, ml | 5 | 5 |
| Methyl ethyl ketone, ml | 10 | 10 |
| Ethanol | (1) | (1) |

[1] To 100 ml.

The drug of the above (4-1) formula, after 3 month's standing at 40° C., gives a remedium cardinale retention rate of 96% and shows no sign of depositing a solid substance. In contrast, the drug of the (4-2) formula free of the sebacic acid ester, antioxidant and carboxylate is unsatisfactory, for it gives a remedium cardinale retention rate of 8% and shows deposition of a solid substance.

COMPOSITION 4

| | (5-1), g. | (5-2), g. |
|---|---|---|
| MPT | 2 | 2 |
| Monoglycol salicylate | 10 | 10 |
| Butylhydroxytoluene | 0.2 | |
| Triethanolamine | 0.2 | |
| Methylparaben | 0.12 | 0.12 |
| Propylparaben | 0.03 | 0.03 |
| Polyethylene glycol-4000 | 36 | 36 |
| Polyethylene glycol-400 | (¹) | (¹) |

¹ To 100 g.

The drug of the above (5-1) formula, after 3 month's standing at 40° C., gives a remedium cardinale retention rate of 100% and shows no sign of depositing solid substances. In contrast, the drug of the (5-2) formula is unsatisfactory because it gives a remedium cardinale retention rate of 48% and shows a deposition of solid substances.

COMPOSITION 5

| | (6-1), g. | (6-2), g. |
|---|---|---|
| MPT | 1 | 1 |
| Triethanolamine | 0.4 | |
| Citric acid | 0.1 | |
| Monoglycol salicylate | 10 | 10 |
| Diethyl sebacate | 10 | 10 |
| Lanolin anhydricum | 5 | 5 |
| Paraffinum durum | 3 | 3 |
| Petrolatum album | (¹) | (¹) |

¹ To 100 g.

The drug of the above (6-1) formula, after 5 month's storage at 40° C., gave a remedium cardinale retention rate of 90% and shows no sign of depositing solid substances. In contrast, the drug of the (6-2) formula free of the carboxylic acid and aliphatic amine is unsatisfactory, for it gives a remedium cardinale retention rate of 30% and shows a deposit of solid substances.

COMPOSITION 6

| | (7-1) | (7-2) |
|---|---|---|
| MPT, g | 2 | 2 |
| Monoglycol salicylate, g | 8 | |
| Butylhydroxytoluene, g | 0.4 | |
| Triethanolamine, g | 2 | |
| Citric acid, g | 0.2 | |
| Methyl ethyl ketone, ml | 30 | 30 |
| Ethanol, ml | 30 | 30 |
| Dichlorodifluoromethane, ml | 20 | 20 |
| Cryofluorane | (¹) | (¹) |

¹ To 100 ml. (at 20° C., 3 atmospheres).

The drug of the above (7-1) formula, after 3 month's storage at 40° C., gives a remedium cardinale retention rate of 97% and shows no sign of depositing solid substances. In contrast, the drug of the (7-2) formula free of the salicylic acid ester, antioxidant, carboxylic acid and aliphatic amine gives a remedium cardinale retention rate of 32% and shows a deposit of solid substances under the same conditions as above.

COMPOSITION 7

| | (8-1), g. | (8-2), g. |
|---|---|---|
| MPT | 40 | 15 |
| Starch | 14.3 | 15 |
| Talc | 105 | 105 |
| Butylhydroxytoluene | 0.2 | |
| Sodium benzoate | 0.5 | |

The drug of the above (8-1) formula, after 3 month's storage at 40° C., and 75% relative humidity, gives a remedium cardinale retention rate of 98.6% and shows no changes in physico-chemical properties. In contrast, the drug of the above (8-2) formula, free of butylhydroxytoluene and sodium benzoate, gives a remedium cardinale retention rate of 75.8% and coagulates itself to lose the function of the drug.

The above mentioned preparations were applied to test drugs for clinical experiment, which proved the usefulness of the invention as follows.

(1) Test drugs

Liquid preparation: 1% or 2% solution of MPT, as per formulation 1.

Ointment: 1% and 2% ointment of MPT, as per formulation 5.

(2) Subjects

Among the patients who visited the dermatologists in eleven establishments (liquid preparation) and those in twelve establishments (paste), most of said establishments being the hospitals annexed to universities in various parts of Japan where experts on dermatophytosis were available, the clinically established dermatophytosis, including *Tinea pedis* and *Tinea corporis*, were treated with the test drugs.

(3) Dosage levels and routes of administration

The liquid preparation and ointment were applied topically to the involved areas by once to 4 times daily (twice as a rule and more or less often according to symptoms).

(4) The season of the year and the durations of application

The tests were conducted from June to October, 1967 and the durations of application ranged from 1 to 77 days, or an average of 16.7 days, for *Tinea pedis*, and from 3 to 30 days, or an average of 13.6 days, for *Tinea corporis*.

(5) Evaluating standards

The following evaluating standards were established based on the results of direct microscopic examinations, in which the pathological specimen taken from the involved area is dissolved in a 20 to 40% potassium hydroxide solution and the resulting solution is examined microscopically for the presence of fungal elements, the results of reverse culture tests, naked-eye clinical findings as to the presence of papules, vesicles, erythra, erosion, fissures, maceration, etc., and subjective symptoms such as an itching sensation.

Very effective: Negative microscopic findings, with clinical symptoms having been completely or almost remedied.

Effective: Despite negative microscopic findings, sufficient improvement has occurred in clinical symptoms; or the clinical symptoms have been improved though microscopic examination results are positive for the causative organism.

Not effective: There has been no improvement whatever or the symptoms have been rather aggravated.

(6) Clinical findings

The subjects totaled 194 cases in 7 establishments for the 1% liquid preparation, 331 cases in 11 establishments for the 2% liquid preparation, 241 cases in 12 establishments for the 1% ointment and 206 cases in 11 establishments for the 2% ointment. The findings are summarized in the following tables.

(1) 1% liquid preparation

| | Number of cases | | | | |
|---|---|---|---|---|---|
| | Effectiveness | | | Total number of cases | Percent effectiveness |
| | Very effective | Effective | Not effective | | |
| Disease: | | | | | |
| Tinea pedis | 19 | 69 | 23 | 111 | 79.3 |
| Tinea cruris | 35 | 15 | 4 | 54 | 92.6 |
| Tinea corporis | 7 | 7 | 2 | 16 | 87.5 |
| Tinea versicolor | 1 | 3 | 4 | 8 | 50.0 |
| Candidal dermatophytosis | 1 | 4 | 0 | 5 | 100 |
| Total | 63 | 98 | 33 | 194 | 83.0 |

(2) 2% liquid preparation

| | Number of cases | | | | |
|---|---|---|---|---|---|
| | Effectiveness | | | Total number of cases | Percent effectiveness |
| | Very effective | Effective | Not effective | | |
| Disease: | | | | | |
| Tinea pedis | 41 | 98 | 31 | 170 | 81.8 |
| Tinea cruris | 91 | 29 | 5 | 125 | 96.0 |
| Tinea corporis | 8 | 6 | 1 | 15 | 93.3 |
| Tinea versicolor | 5 | 3 | 1 | 9 | 88.9 |
| Candidal dermatophytosis | 0 | 2 | 0 | 2 | 100 |
| Total | 145 | 138 | 38 | 321 | 88.22 |

(3) 1% ointment

| | Number of cases | | | | |
|---|---|---|---|---|---|
| | Effectiveness | | | Total number of cases | Percent effectiveness |
| | Very effective | Effective | Not effective | | |
| Disease: | | | | | |
| Tinea pedis | 51 | 92 | 25 | 168 | 85.1 |
| Tinea cruris | 36 | 23 | 2 | 61 | 96.7 |
| Tinea corporis | 6 | 4 | 0 | 10 | 100 |
| Candidal dermatophytosis | 0 | 1 | 1 | 2 | 50 |
| Total | 93 | 120 | 28 | 241 | 88.4 |

(4) 2% ointment

| | Number of cases | | | | |
|---|---|---|---|---|---|
| | Effectiveness | | | Total number of cases | Percent effectiveness |
| | Very effective | Effective | Not effective | | |
| Disease: | | | | | |
| Tinea pedis | 39 | 77 | 16 | 132 | 87.9 |
| Tinea cruris | 27 | 26 | 1 | 54 | 98.1 |
| Tinea corporis | 11 | 1 | 0 | 12 | 100 |
| Tinea versicolor | 1 | 0 | 0 | 1 | 100 |
| Candidal dermatophytosis | 1 | 5 | 0 | 6 | 100 |
| Trichophytia superficialis | 1 | 0 | 0 | 1 | 100 |
| Total | 80 | 109 | 17 | 206 | 91.7 |

What we claim is:

1. A method for treating dermatophytosis, which comprises applying to the region of dermatophytosis a dermatophytes - inhibiting amount of 3-(p - methylbenzylideneamino) - 4 - phenylthiazoline - 2 - thione as the active ingredient.

2. The method according to claim 1, wherein the active ingredient is in the form of a pharmaceutical composition comprising said ingredient at a concentration of from about 0.1 to about 50% on a weight basis relative to the whole composition and the remainder being essentially a pharmaceutically acceptable carrier therefor.

3. The method according to claim 2, wherein the composition is in the form of a powder comprising from about 1 to 50% on a weight basis of the active ingredient.

4. The method according to claim 2, wherein the composition is in the form of a liquid preparation comprising from about 0.1 to about 10% on a weight basis of the active ingredient.

5. The method according to claim 2, wherein the composition is in the form of an ointment comprising from about 0.1 to about 10% on a weight basis, of the active ingredient.

6. The method according to claim 2, wherein the composition is in the form of a spray comprising from about 0.01 to about 20% on a weight basis of the active ingredient.

7. A composition for the therapy of dermatophytosis which comprises a dermatophytes-inhibiting amount of 3-(p-methylbenzylideneamino) - 4 - phenylthiazoline-2-thione in admixture with a pharmaceutical carrier wherein the carrier contains as a stabilizer from about 0.01 to about 10% by weight of at least one member selected from (a) one or more phenol antioxidants selected from the group consisting of butylhydroxy toluene, butyl hydroxyanisol, pyrocatechol, pyrogallol and nordihydroguaiaretic acid; (b) at least one amine selected from the group consisting of primary alkyl and hydroxy-alkyl amines having 1 to 15 carbon atoms, secondary alkyl and hydroxy-alkyl amines having 2 to 20 carbon atoms and tertiary alkyl and hydroxy-alkyl amines having 3 to 9 carbon atoms; and (c) an aromatic carboxylic acid selected from the group consisting of benzoic and salicylic acid or aliphatic carboxylic acid selected from the group consisting of citric acid, succinic acid, malonic acid, tartaric acid, fumaric acid, maleic acid and pharmaceutically acceptable metal salts of said acids.

8. A composition for the therapy of dermatophytosis which comprises a dermatophytes-inhibiting amount of 3-(p - methylbenzylideneamino) - 4 - phenylthiazoline-2-thione in admixture with a pharmaceutical carrier wherein the carrier contains as a stabilizer from about 5 to about 60 weight percent of at least one member selected from (1) a carboxylic acid ester containing 1 to 25 carbon atoms in the carboxylic acid residue; and (2) a higher fatty acid containing 10 to 30 carbon atoms.

9. A composition for the therapy of dermatophytosis which comprises a dermatophytes-inhibiting amount of 3-(p-methylbenzylideneamino) - 4 - phenylthiazoline-2-thione in admixture with a pharmaceutical carrier wherein the carrier contains as a stabilizer from about 0.01 to about 10% by weight of at least one member selected from (a) one or more phenol antioxidants selected from the group consisting of butylhydroxy toluene, butyl hydroxyanisol, pyrocatechol, pyrogallol and nordihydroguaiaretic acid; (b) at least one amine selected from the group consisting of primary alkyl and hydroxy-alkyl amines having 1 to 15 carbon atoms, secondary alkyl and hydroxy-alkyl amines having 2 to 20 carbon atoms and tertiary alkyl and hydroxy-alkyl amines having 3 to 9 carbon atoms; and (c) an aromatic carboxylic acid selected from the group consisting of benzoic and salicylic acid or aliphatic carboxylic acid selected from the group consisting of citric acid, succinic acid, malonic acid, tartaric acid, fumaric acid, maleic acid and pharmaceutically acceptable metal salts of said acids, and also as a stabilizer from about 5 to about 60 weight percent of at least one member selected from (1) a carboxylic acid ester containing 1 to 25 carbon atoms in the carboxylic acid residue, and (2) a higher fatty acid containing 10 to 30 carbon atoms.

References Cited

Takeda, Chem. Abst. vol. 67 (1967), p. 64389z.

SAM ROSEN, Primary Examiner